(12) United States Patent
Furkert et al.

(10) Patent No.: US 7,444,886 B2
(45) Date of Patent: Nov. 4, 2008

(54) FLOATING BODY FLOWMETER

(75) Inventors: Wilfried Furkert, Göttingen (DE); Dieter Keese, Wahlsburg (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 11/708,361

(22) Filed: Feb. 21, 2007

(65) Prior Publication Data

US 2007/0199388 A1  Aug. 30, 2007

(30) Foreign Application Priority Data

Feb. 24, 2006 (DE) .................. 10 2006 008 595

(51) Int. Cl.
*G01F 1/22* (2006.01)

(52) U.S. Cl. .................................. 73/861.53

(58) Field of Classification Search ............. 73/861.57, 73/861.53, 861.58, 861.56; 137/557, 559
See application file for complete search history.

(56) References Cited

U.S. PATENT DOCUMENTS

| | | | | |
|---|---|---|---|---|
| 3,662,598 | A | * | 5/1972 | Spencer .................... 73/861.05 |
| 3,696,665 | A | * | 10/1972 | Poppe et al. ................... 73/104 |
| 3,812,715 | A | * | 5/1974 | Whalen .................... 73/861.57 |
| 4,507,643 | A | * | 3/1985 | Sunano et al. ................. 338/34 |
| 5,655,568 | A | * | 8/1997 | Bhargava et al. ............ 137/557 |
| 6,832,520 | B2 | * | 12/2004 | Bernard .................... 73/861.57 |

FOREIGN PATENT DOCUMENTS

| | | |
|---|---|---|
| DE | 1 889 207 | 8/1964 |
| DE | 2 255 327 | 5/1974 |
| DE | 28 04 266 | 8/1979 |
| DE | 295 01 626.4 | 5/1995 |

* cited by examiner

*Primary Examiner*—Jewel Thompson
(74) *Attorney, Agent, or Firm*—Buchanan Ingersoll & Rooney PC

(57) ABSTRACT

A floating body flowmeter having a measuring tube (1) which is positioned vertically and through which a substance (2) to be measured flows, in which tube a floating body (3) is arranged in order to determine the flow rate, the rise height (h) of said body relative to the measuring tube (1) being in a defined relationship with the flow rate, it being possible for the measuring range to be adjusted at least via the density of the floating body (3), and the floating body (3) being heterogeneous in such a way that the latter consists of an industrial mass-produced material in the core (4), the material selection being coordinated with the fact that the measuring range can be adjusted substantially via the density of the core (4), and the core (4) is provided with an external coating (5), its material being coordinated with the fact that this is chemically and/or mechanically resistant to the substance to be measured, and furthermore that all the other parts in contact with the substance to be measured are coated so as to be resistant to the substance to be measured.

24 Claims, 1 Drawing Sheet

FLOATING BODY FLOWMETER

CROSS REFERENCE TO RELATED APPLICATIONS

This application claims priority under 35 U.S.C. §119 to German Application 10 2006 008 595.7 filed in Germany on 24 Feb. 2006, the entire contents of which are hereby incorporated by reference in their entireties.

FIELD

A floating body flowmeter having a measuring tube which is positioned vertically and through which a substance to be measured flows is disclosed. A floating body is arranged in the measuring tube in order to determine the flow rate, the rise height of said body relative to the measuring tube being in a defined relationship with the flow rate, it being possible for the measuring range to be adjusted at least via the density of the floating body.

BACKGROUND INFORMATION

Floating body flowmeters of the type designated above are primarily used to register volume flows, that is to say flow rates, in closed pipelines and, because of their simplicity and ruggedness, have found wide application in particular in the chemical and process industry but also in medicine and natural sciences. Floating body flowmeters may be divided into devices in which the floating body interacts with a conical measuring tube and devices in which a conical floating body interacts with a fixed orifice plate arranged in a fixed location with respect to the measuring tube.

The general measuring principle of floating body flowmeters is that, as a result of the weight of the floating body, the buoyancy force of the floating body and the force of the flow of the substance to be measured, a force equilibrium is established. In the event that the flow rate through the measuring tube varies, the force of the flow acting on the floating body changes accordingly, so that the force equilibrium changes, which is changed in a correspondingly varied vertical position of the floating body in the conical measuring tube or in a changed vertical position of the conical floating body in an orifice plate.

The vertical position is a measure of the flow rate. The measuring range of a floating body flowmeter is determined by the geometric dimension and shape of the floating body, of the measuring tube or of the orifice plate, in particular the taper of the measuring tube or of the floating body, but also by the density of the material of which the floating body consists. The present invention is dedicated to the last-named aspect.

DE 39 22 609 A1 reveals a floating body flowmeter which makes use of a conical floating body in combination with an orifice plate. The geometry of the floating body is such that the smallest cross section that acts in the annular measuring gap is located in the central part of the floating body, the length of the floating body without guide elements being equal to or greater than twice the displacement of the floating body, and the upper and lower half optionally tapering differently toward the center of the floating body. Thus, by means of simply rotating the floating body through 180°, a choice can be made between two different measuring ranges. The choice of the measuring range depends in particular on the viscosity of the substance to be measured flowing through the measuring tube and its flow rate. The measuring tube is transparent here, so that the vertical position of the floating body, representing the current flow rate, can be perceived or registered optically from the outside.

DE 34 11 156 A1 reveals a further generic floating body flowmeter, here on the principle of a conical measuring tube in combination with a normal floating body. Accordingly, the floating body is configured so as to correspond to the purpose and can move freely, at least in the flow direction. The substance to be measured and whose flow rate is to be measured flows through the vertically arranged measuring tube counter to the force of gravity, that is to say substantially from bottom to top. Together with the measuring tube, therefore, the floating body forms a throttling point which widens toward the top. The density of the floating body must also be greater than the substance to be measured flowing through the measuring tube. Depending on the flow rate, in the steady-state the floating body is adjusted to a specific vertical position in the measuring tube, which results from the equilibrium between the hydrodynamic force caused by the flow and transferred to the floating body and the difference of the weight or buoyancy forces of the floating body. The taper of the measuring tube, which, in the lower region of the measuring tube, has the effect of a lower diameter than in the upper region of the measuring tube, varies the size of the throttling point along the vertical position of the floating body, so that the result is a mathematical relationship between the vertical position of the floating body and the flow rate through the measuring tube.

In the embodiment specified in this prior art, the measuring tube is opaque and the vertical position of the floating body located on the inside is registered inductively. For this purpose, a plurality of magnetic field sensors placed at a distance from one another are arranged on the outside of the conical measuring tube and respond to the magnetic field of a permanent magnet contained in the floating body. An evaluation device connected downstream supplies a position signal which indicates the height of the magnet and therefore the height of the floating body within the measuring tube.

In the floating body flowmeters of the type described above, suitable floating bodies are usually chosen depending on the viscosity and temperature of the substance to be measured and on the flow range to be measured. In this case, in particular, the weight of the floating body resulting from the density of the material used plays a decisive role. For example, at high flow rates and/or with low viscosities of the substance to be measured, relatively heavy floating bodies are used, whereas at low flow rates and/or with high viscosities of the substance to be measured, lightweight floating bodies are used. Thus, the measuring range of a floating body flowmeter can be adjusted in a simple way via the density of the floating body.

However, the disadvantage here is that, given a predefined geometric shape of the floating body, in order to achieve the desired weight a material would have to be considered which, on the other hand, however, is not chemically compatible with the substance to be measured. Therefore, if the flow rate of aggressive substances to be measured is to be determined by means of a floating body flowmeter, then the material selection of the floating body also influences the chemical resistance to the substance to be measured.

In these cases of multiple dependency in the selection criteria, it is normally necessary to fall back on materials such as platinum alloys, titanium alloys and the like. The additional condition that the material used for the floating body must also be resistant to the substance to be measured has a limiting effect on the number of suitable materials. Thus, complicated materials which meet the existing conditions are normally required.

SUMMARY

A floating body for a floating body flowmeter is disclosed which can be fabricated from a simple material and, nevertheless, is resistant to aggressive substances to be measured. An exemplary disclosure includes a floating body which is heterogeneous in such a way that the latter consists of an industrial mass-produced material in the core, the material selection being coordinated with the fact that the measuring range can be adjusted substantially via the density of the core, and that the core is provided with an external coating, its material being coordinated with the fact that this is chemically resistant to the substance to be measured. Going beyond this, all the other parts in contact with the substance to be measured are coated so as to be resistant to the substance to be measured. This also includes the orifice plate and cone.

The coating of a floating body substantially comprising a core can be chemically resistant to the substance to be measured. In order to determine the weight of the floating body, it is thus possible to use materials which can be chosen completely independently of the chemical properties of the substance to be measured. Due to different materials, there is a difference between the density of the coating and the density of the core, and the total weight of the floating body is composed proportionately of the two values. Since the floating body can be composed of an industrial mass-produced material, which is defined by mass availability, low price and simple machining in terms of fabrication, floating bodies can be produced cost-effectively in a straightforward manner for quite different measuring ranges and for different substances to be measured. Exemplary measuring ranges that can be implemented can be considered independently of the question of the chemical and mechanical resistance of the floating body material to the substance to be measured.

As a result of the all-encompassing coating of all the parts in contact with the substance to be measured, a flowmeter of this type can consist of plastic or other base materials and, nevertheless, as a result of the coating, can have the necessary chemical and possibly also mechanical resistance.

The solution can be used anywhere where the measuring range of the floating body flowmeter is modified with the density of the floating body material, that is to say anywhere where the adjustment of the measuring range is effected by the use of different materials, in addition the resistance of the material to the substance to be measured having to be taken into account. The coating of the floating body substantially comprising a core makes it possible to implement the desired measuring range without changing the basic material of the floating body and without varying the geometry of the measuring system with regard to taper of measuring tube or floating body, dimension and shape of the floating body.

BRIEF DESCRIPTION OF THE DRAWINGS

Further measures improving the invention will be explained in more detail below together with the description of exemplary embodiments of the invention, by using figures, in which.

DETAILED DESCRIPTION

Figure 1:
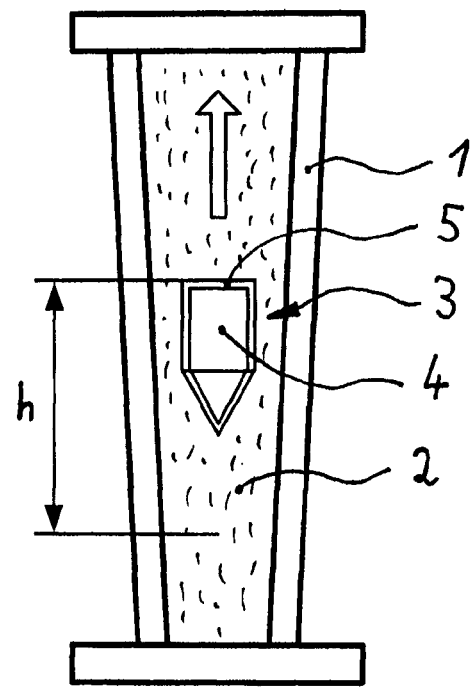
FIG. 1 shows an exemplary floating body flowmeter having a conical measuring tube.

According to FIG. 1, the floating body flowmeter of this exemplary embodiment has a conical measuring tube 1, which tapers counter to the flow direction of a free-flowing substance 2 to be measured, marked by the arrow illustrated. The measuring tube 1 is positioned vertically and contains a floating body 3. If the substance 2 to be measured flows in the flow direction, then the buoyancy force produced by the flow in the measuring tube 1 will raise the floating body 3 to such an extent that between the drive force, on the one hand, and the weight of the floating body 3, on the other hand, an equilibrium state is established, which is determined by the flow rate of the substance 2 to be measured, on the one hand, and the size of the free flow cross section between floating body 3 and the wall of the measuring tube 1. The rise height h relative to the measuring tube 1 produced by the raising action characterizes the flow rate.

The exemplary floating body 3 is heterogeneous. To this extent, the latter consists substantially of an iron core 4. The material iron is an industrial mass-produced material and has been chosen here in order to adjust the measuring range of the floating body flowmeter via the density of the core 4. This is because the weight, which influences the force equilibrium in the manner explained above, is primarily determined by the density of the core 4. The core 4 is surrounded by an external coating 5 which, in this exemplary embodiment, consists of plastic. Since the substance 2 to be measured here is a salt solution in water, the core 4 would on its own not be chemically resistant to this substance 2 to be measured. Only the plastic coating 5 permits an independent choice of material for the core 4, based only on the desired density. If the total weight of the floating body 3 is influenced significantly by the plastic coating 5, this proportion of the weight also has to be taken into account.

Figure 2:
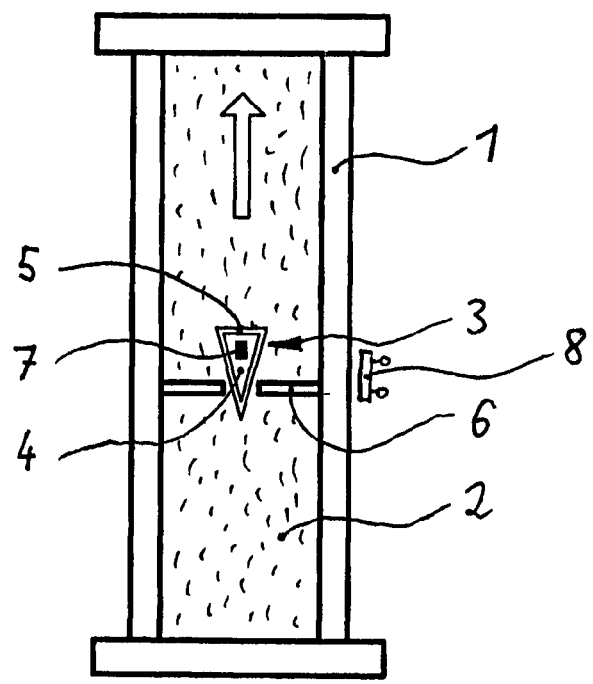
FIG. 2 shows an exemplary floating body flowmeter having a conical floating body.

According to FIG. 2, as distinct from the exemplary embodiment described above, the measuring tube 1 is straight and contains an orifice plate 6 arranged in a fixed location with respect to the measuring tube 1 and having a defined throttling cross section, in which a conically shaped floating body 3 is placed. The conically shaped floating body interacts with the orifice plate 6 in an analogous way to that described in the preceding exemplary embodiment, so that this does not need to be discussed again.

As distinct from the exemplary embodiments described above, floating body 4 comprises a plastic core, in which a permanent magnet 7 is embedded. The permanent magnet 7 is encapsulated by the plastic of the core 4. The permanent magnet 4 interacts with an inductive distance transducer 8 arranged on the outside of the measuring tube 1 in order to implement an inductive distance measurement.

The core 4 of the floating body 3 consists of a plastic which is normally not resistant to the substance 2 to be measured but which has the desired density in order to produce the desired weight of the floating body 3. In order to protect the core 4, this is covered by a coating 5 of another plastic which is resistant to the substance 2 to be measured.

The resistant coating of the floating body can be formed as a plastic coating, nitrate coating or ceramic coating. The choice of the coating material depends in particular on its resistance to the substance to be measured and on the material used for the core. This is because a nitrate coating is suitable for metallic materials, whereas a plastic coating can be used quite universally. The coating can be carried out by means of vapor deposition or spraying onto the surface of the core, in particular when a plastic coating or a ceramic coating is to be achieved. In the case of a metallic core, the coating can also be applied by means of electroplating.

For a floating body of low weight, the mass-produced material suitable for the core is primarily a plastic, which can be selected from a material group comprising the plastics:

polypropylene, polyethylene, polyvinyl chloride. For heavy floating bodies, the mass-produced materials suitable for the core are primarily metals, such as iron, lead or alloys thereof. In addition, it is also possible to produce lightweight floating bodies from lightweight metals, such as aluminum or aluminum alloys and the like.

The core can also consist of a material combination. For the case in which an inductive distance measurement of the vertical position of the floating body is to be carried out, the core can consist of a material combination of plastic with permanent magnets embedded therein. The permanent magnet can be encapsulated by the plastic in a simple way by means of injection molding. The magnetic field originating from the permanent magnet serves an inductive sensor arranged on the outside of the measuring tube.

If a direct optical distance measurement of the current vertical position of the floating body within the measuring tube is to be carried out, the measuring tube can also consist of a transparent material, so that the current vertical position of the floating body can be determined manually by observation or by means of optical position registering systems.

An exemplary core of the floating body can be formed as a hollow body, in order to create a supplementary possibility for adjusting the measuring range. This is because, as compared with a solid body, less material is needed for a hollow body, which reduces the weight of the floating body in a corresponding way. Thus, even with given external geometric dimensions of the floating body, a relatively lightweight floating body can be produced with a material of relatively high density, which, in particular, is suitable for substances to be measured of high viscosity and/or low flow rate.

The invention is not restricted to the exemplary embodiments described. For example, other constituent parts of a floating body flowmeter can also be provided with a coating resistant to the substance 2 to be measured, for the purpose of protection. The solution according to the invention makes it possible to use cost-effective materials for the basic material of the floating body 3, that is to say for the production of the core 4, and other parts in contact with the substance to be measured, depending on the individual case. The principle according to the invention of the special coating makes it possible to expand the range of application of floating body flowmeters accordingly and to make it more flexible.

Thus, for example, basic devices from mass production can be modified in a straightforward way for new measuring tasks, for which purpose, according to the prior art, far more complicated and specific solutions were previously necessary.

LIST OF DESIGNATIONS

1 Measuring tube
2 Substance to be measured
3 Floating body
4 Core
5 Coating
6 Orifice plate
7 Permanent magnet
8 Displacement transducer

The invention claimed is:

1. A floating body flowmeter, comprising:
   a measuring tube through which a substance to be measured flows, in which tube a floating body is arranged in order to determine a flow rate,
   wherein the floating body includes a core formed of a first material, and the core is provided with an external coating, the external coating material being coordinated to be resistant to the substance to be measured, a rise height (h) of the floating body relative to the measuring tube being in a defined relationship with the flow rate, a measuring range being adjustable at least via a density of the floating body, and the first material and the coating being coordinated with the measuring range which is adjusted substantially via a density of the core and the external coating.

2. The floating body flowmeter as claimed in claim 1, wherein the resistant coating is formed as a nitrate coating or ceramic coating.

3. The floating body flowmeter as claimed in claim 2, wherein the coating is applied by means of vapor deposition or spraying onto the surface of the core.

4. The floating body flowmeter as claimed in claim 2, wherein, in the case of a metallic core, the coating is applied by means of electroplating.

5. The floating body flowmeter as claimed in claim 1, wherein the first material is a plastic.

6. The floating body flowmeter as claimed in claim 5, wherein the first material is selected from a material group consisting of polypropylene, polyethylene, and polyvinyl chloride.

7. The floating body flowmeter as claimed in claim 1, wherein the first material is a metal.

8. The floating body flowmeter as claimed in claim 7, wherein the first material is selected from a group of materials consisting of iron, aluminum, lead and alloys thereof.

9. The floating body flowmeter as claimed in claim 1, wherein the core consists of a single material or of a material combination.

10. The floating body flowmeter as claimed in claim 9, wherein the material combination contains a permanent magnet, in order to implement an inductive distance measurement on the measuring tube.

11. The floating body flowmeter of claim 10, comprising a transducer.

12. The floating body flowmeter as claimed in claim 1, wherein the measuring tube is comprised of a transparent material, in order to implement a direct optical distance measurement on the measuring tube.

13. The floating body flowmeter as claimed in claim 12, wherein the core of the floating body is formed in the manner of a hollow body in order to create a supplementary possibility for adjusting the measuring range.

14. The floating body flowmeter as claimed in claim 13, wherein the measuring tube is shaped so as to be internally conical, tapering counter to a flow direction of the substance to be measured.

15. The floating body flowmeter as claimed in claim 13, wherein the measuring tube contains an orifice plate, with which an at least partly conically tapered floating body interacts.

16. The floating body flowmeter as claimed in claim 1, wherein the coating is applied by means of vapor deposition or spraying onto the surface of the core.

17. The floating body flowmeter as claimed in claim 1, wherein, in the case of a metallic core, the coating is applied by means of electroplating.

18. The floating body flowmeter as claimed in claim 1, wherein the measuring tube is shaped so as to be internally conical, tapering counter to a flow direction of the substance to be measured.

19. The floating body flowmeter as claimed in claim 1, wherein the measuring tube contains an orifice plate, with which an at least partly conically tapered floating body interacts.

20. The floating body flowmeter of claim 1, wherein the resistant coating is formed of a plastic.

21. The floating body flowmeter of claim 1, wherein all parts of the flowmeter which come in contact with the substance to be measured are coated so as to be resistant to the substance to be measured.

22. The floating body flowmeter of claim 1, wherein the resistant coating is chemically resistant to the substance to be measured.

23. The floating body flowmeter of claim 1, wherein the resistant coating is mechanically resistant to the substance to be measured.

24. The floating body flowmeter of claim 1, wherein the floating body is a freely floating body.

* * * * *